E. F. NORTHRUP.
ELECTRICAL MEASURING APPARATUS.
APPLICATION FILED MAY 1, 1916.
1,245,609.
Patented Nov. 6, 1917.
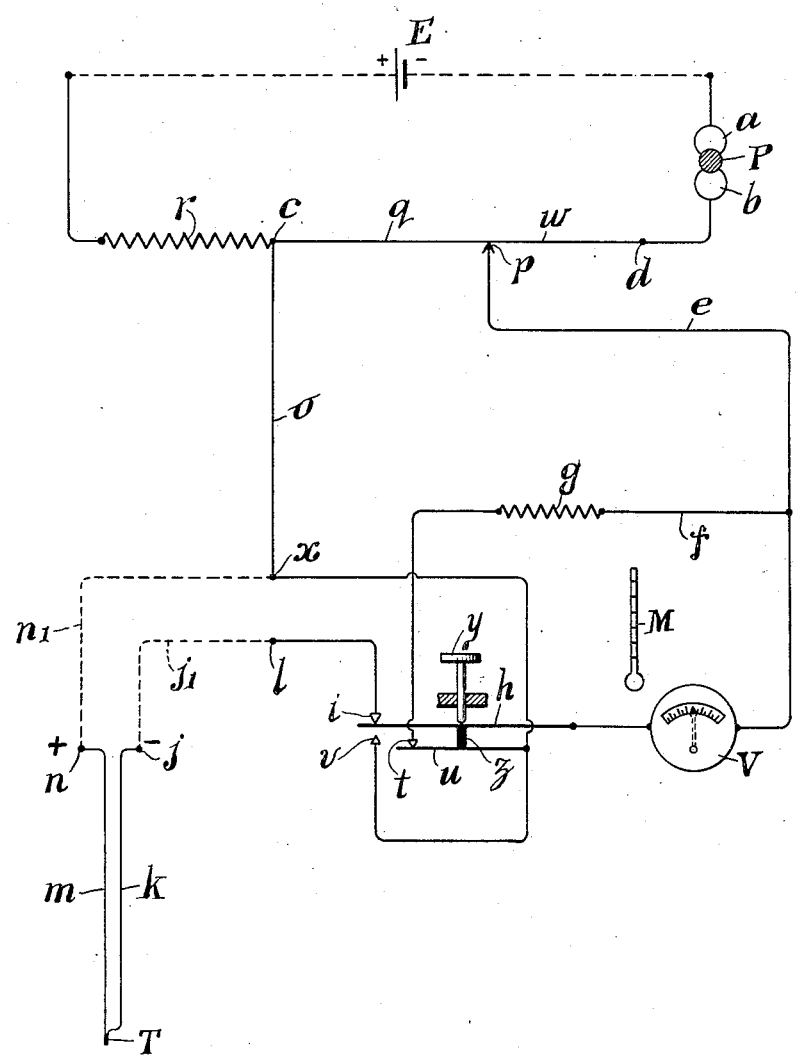

UNITED STATES PATENT OFFICE.

EDWIN F. NORTHRUP, OF PRINCETON, NEW JERSEY, ASSIGNOR TO PYROLECTRIC INSTRUMENT CO., OF TRENTON, NEW JERSEY, A CORPORATION OF NEW JERSEY.

ELECTRICAL MEASURING APPARATUS.

1,245,609.

Specification of Letters Patent.  Patented Nov. 6, 1917.

Application filed May 1, 1916. Serial No. 94,534.

*To all whom it may concern:*

Be it known that I, EDWIN F. NORTHRUP, a citizen of the United States, residing at Princeton, county of Mercer, State of New Jersey, have invented new and useful Electrical Measuring Apparatus, of which the following is a specification.

My invention relates to electrical measuring apparatus, and more particularly to an electrical pyrometer or temperature measuring apparatus.

My invention resides in electrical measuring apparatus comprising a galvanometer, such as a millivoltmeter, milliammeter, or similar instrument, preferably comprising a coil movable in a permanent magnet field, said galvanometer being connected in series with the source of electro-motive-force of unknown value, together with means for producing a fall or difference of potential equal to the unknown electro-motive-force as indicated by zero deflection of the galvanometer, and means for changing the connections of the galvanometer to a relation for indicating by its deflection the value of the unknown electro-motive-force.

And my invention resides in such electrical measuring apparatus in which the fall or difference of potential is produced by current from an ordinary battery or other source of current, without necessity for employment of a standard cell; my invention resides further in an arrangement of such electrical measuring apparatus wherein the resistance of the source of unknown electro-motive-force or of its leads or circuit or of the resistance of the galvanometer have no effect and may be disregarded; and my invention resides further in such an electrical measuring apparatus in which the source of electro-motive-force of unknown value may be a thermo-couple or thermo-element, in which case the apparatus serves as a pyrometer or temperature measuring apparatus.

For an illustration of one of the forms my invention may take, reference may be had to the accompanying drawing, which is a diagrammatic view of the apparatus and circuits involved.

Referring to the drawing, E is a battery, dry cell or other source of direct current which need not, however, be a standard cell or source of unvarying or constant electromotive-force. Upon insertion of the plug P between the plug contacts $a$ and $b$ a circuit will be closed through the resistance $r$ and the potentiometer slide wire $w$ extending from the point $c$ to the point $d$. Movable in contact with the slide wire $w$ is the slider contact $p$ connected through conductor $e$ to one terminal of a millivoltmeter V. This instrument may be of the type involving a coil movable in a permanent magnet field and may be, for example, a Weston direct current millivoltmeter. Or V may be any type of direct current reading instrument adapted to give a deflection with a small current. The conductor $e$ connects also through conductor $f$ with one terminal of the resistance $g$ which is made exactly equal to the resistance of the millivoltmeter or other instrument V. The remaining terminal of the millivoltmeter V connects to the contact spring $h$ which is normally in electrical contact with the stationary contact $i$ connected to the terminal $l$. The thermo-element or thermo-electric couple comprising the conductors $k$ and $m$ of dissimilar metals, forming a thermo-junction T which is subjected to the temperature to be measured, may have terminals $j$ and $n$ connected to the terminals $l$ and $x$ by the leads $j^1$ and $n^1$ shown in dotted lines.

The lead $n^1$ may be of any length and should preferably consist of wire of the same material as the thermo-couple wire $m$. Likewise the lead $j^1$ should be of the same material as the wire $k$ of the thermo-element. Then if at $x$ and $l$ the leads become copper for the other circuits the cold junction of the thermo-couple is located at the points $x$ and $l$ near together and at the measuring apparatus.

The remaining terminal of the resistance $g$ connects to stationary contact $t$ normally engaged by the contact spring $u$ which is connected to the stationary contact $v$ and to the terminal $x$ which connects by wire $o$ to the slide wire at $c$. A button or key $y$ is adapted to thrust downwardly upon the contact spring $h$ to deflect the same and in so doing transmit a pressure through the insulating member $z$ to the contact spring $u$ to simultaneously deflect it.

The mode of operation is as follows:

With the contact springs $h$ and $u$ in their normal positions indicated in the drawing, the resistance $g$ is connected in shunt with that part of the slide wire $w$ between the point $c$ and the rider contact $p$, and the thermo-junction T and the millivoltmeter V are connected in series with each other and in shunt to the resistance $g$ and the said portion of the slide wire $w$.

The rider contact $p$ is then moved along the slide wire resistance $w$ to such position that the millivoltmeter V indicates that position which corresponds to that position which the pointer takes when no current flows through the millivoltmeter V. When this condition obtains it indicates that the thermo-element $m, k$, is generating such electro-motive-force, due to the difference in temperature between its hot junction T and its cold junction at $j, n$, or at $x, l$ when leads of the same material as the thermo-element are continued to $x, l$, that it exactly balances the fall of potential due to the current delivered by the battery E through the resistances $q$ and $g$ in parallel with each other, $q$ being the resistance of that part of the slide wire $w$ between the point $c$ and movable contact $p$, and $g$ being as stated equal to the resistance of the millivoltmeter V. After this balance has been obtained, the button or key $y$ is depressed, with the result that the contact spring $h$ separates from contact $i$ and engages contact $v$, and contact spring $u$ separates from contact $t$. The result is that the resistance $g$ is taken out of circuit, as is also the thermo-element $m, k$, and the millivoltmeter V is now brought into shunt with the resistance $q$. Since the millivoltmeter V has a resistance equal to the resistance $g$, the current through the resistance $q$ is the same as it was before the key or button $y$ was depressed, because for the resistance $g$ has been substituted an equal resistance, that of the millivoltmeter V. And accordingly the millivoltmeter gives a deflection whose reading is equal to the fall of potential across the resistance $q$, which is the same fall of potential which was balanced by the electro-motive force produced by the thermo-element $m, k$. In other words, the millivoltmeter now gives a reading, which, if the instrument is calibrated in electro-motive-force, is equal to the electro-motive-force produced by the thermo-element $m, k$. Or if the instrument V is calibrated in temperatures, as it may be by well known methods with respect to the particular thermo-element $m, k$ employed, the instrument V will read directly the difference in temperature between the cold and hot junctions of the thermo-element.

When the instrument V is calibrated in degrees of temperature, the position taken by its pointer when a balance is obtained as above described, that is, when no current is flowing through the instrument, will be marked 20 degrees centigrade, which is the average temperature of the cold junction or average room temperature. A small mercury thermometer M located in the base of the instrument V will be consulted to indicate the temperature in degrees centigrade above or below 20 degrees centigrade. This reading of the mercury thermometer can then be added or subtracted from the temperature indicated by the instrument V. The correction for a temperature of the cold junction, located at the instrument V or in its base, is in this way taken care of.

From the foregoing it will therefore be seen that the length or diameter of the thermo-element conductors $m, k$ may be anything desired, because their resistance in no way affects the results. Therefore these conductors $m$ and $k$ may be very fine or small, especially when of noble metals, and may extend from the hot junction T, however remote, to the reading instrument, that is, to the points $x, l$, whereby the cold junction may be maintained near or at the reading instrument V. And it also is readily seen that the resistance of the voltmeter V as such in the circuit of the thermo-element is a matter of indifference, because an adjustment is made of the contact $p$ which will cause the millivoltmeter V to give zero indication, that is, to produce a condition such that no current flows through the voltmeter V, and under such circumstances its resistance is a matter of indifference.

As intimated above, the battery E need not be a standard cell, because its voltage or electro-motive-force will not vary during the time of an observation which requires but a few seconds. And if it should vary from day to day it is immaterial, because whatever its electro-motive-force, the contact $p$ is moved to such point that the fall of potential across the resistances $q$ and $g$ joined in parallel is equal to the electro-motive-force produced by the thermo-element.

In practice the spring contacts $i, v, t$, the button $y$, the resistances $r, g$ and $q$ and the plug P would all be permanently located in the base of the instrument V and constitute a single, portable and robust unit. The thermo-couple $m, k$ and the dry cell E would be attached to this unit by the leads shown in dotted lines.

What I claim is:

1. The combination with a resistance, of means for passing current therethrough, a source of electro-motive-force of unknown value, a deflection instrument, a second resistance of a magnitude equal to the resistance of said deflection instrument, said second resistance connected in parallel with a variable portion of said first named resistance, said source of electro-motive-force and deflection instrument connected in series with each other and in shunt to said resistances, and switching mechanism for disconnecting said source of electro-motive-force and substituting said deflection instrument for said second named resistance.

2. The combination with a potentiometer slide wire, of a contact adjustable along the same, a resistance connected through said contact in shunt with a variable portion of said slide wire, a source of electro-motive-force of unknown value and a deflection instrument connected in series with each other and in shunt to said resistance and said portion of said slide wire, and means for disconnecting said source of electro-motive-force and substituting said deflection instrument for said resistance.

3. The combination with a resistance, of means for passing current therethrough, a thermo-element, a deflection instrument, a second resistance of a magnitude equal to the resistance of said deflection instrument, said second resistance connected in parallel with a variable portion of said first named resistance, said thermo-element and deflection instrument connected in series with each other and in shunt to said resistances, and switching mechanism for disconnecting said thermo-element and substituting said deflection instrument for said second named resistance.

4. The combination with a resistance, of means for passing current therethrough, a thermo-element, a deflection instrument, a second resistance of a magnitude equal to the resistance of said deflection instrument, said second resistance connected in parallel with a variable portion of said first named resistance, said thermo-element and deflection instrument connected in series with each other and in shunt to said resistances, and switching mechanism for disconnecting said thermo-element and substituting said deflection instrument for said second named resistance, said thermo-element having its cold junction at said deflection instrument.

5. The combination with a potentiometer slide wire, of a contact adjustable along the same, a resistance connected through said contact in shunt with a variable portion of said slide wire, a thermo-element and a deflection instrument connected in series with each other and in shunt to said resistance and said portion of said slide wire, said resistance having a magnitude equal to the resistance of said deflection instrument, and means for disconnecting said thermo-element and substituting said deflection instrument for said resistance.

6. The combination with a potentiometer slide wire, of a contact adjustable along the same, a resistance connected through said contact in shunt with a variable portion of said slide wire, a thermo-element and a deflection instrument connected in series with each other and in shunt to said resistance and said portion of said slide wire, said resistance having a magnitude equal to the resistance of said deflection instrument, and means for disconnecting said thermo-element and substituting said deflection instrument for said resistance, said thermo-element having its cold junction at said deflection instrument.

7. The combination with a resistance, of means for passing current therethrough, a second resistance having a connection with said first named resistance, a source of electro-motive-force of unknown value and a deflection instrument connected in series with each other and in shunt to said second resistance, said second resistance having a magnitude equal to the resistance of said deflection instrument, a movable contact engaging said first named resistance and connected to the remaining terminal of said second resistance, whereby the portion of said first named resistance in shunt to said second named resistance is adjusted to such value that the unknown electro-motive-force balances the fall of potential across said resistances, and means for disconnecting said source of electro-motive-force and substituting said deflection instrument for said second resistance, whereby said deflection instrument indicates the value of said unknown electro-motive-force.

8. The combination with a resistance, of means for passing current therethrough, a second resistance having a connection with said first named resistance, a thermo-element and a deflection instrument connected in series with each other and in shunt to said second resistance, said second resistance having a magnitude equal to the resistance of said deflection instrument, a movable contact engaging said first named resistance and connected to the remaining terminal of said second resistance, whereby the portion of said first named resistance in shunt to said second named resistance is adjusted to such value that the electro-motive-force of said thermo-element balances the fall of potential across said resistances, and means for disconnecting said thermo-element and substituting said deflection instrument for said second resistance, whereby said deflection instrument indicates the value of the electro-motive-force of said thermo-element.

9. The combination with a resistance, of means for passing current therethrough, a second resistance having a connection with said first named resistance, a thermo-element and a deflection instrument connected in series with each other and in shunt to said second resistance, said second resistance having a magnitude equal to the resistance of said deflection instrument, a movable contact engaging said first named resistance and connected to the remaining terminal of said second resistance, whereby the portion of said first named resistance in shunt to said second named resistance is adjusted to such value that the electro-motive-force of said thermo-element balances the fall of potential across said resistances, and means for disconnecting said thermo-element and substituting said deflection instrument for said second resistance, said deflection instrument being calibrated in temperatures whereby it indicates the temperature difference between the hot and cold junctions of said thermo-element.

10. The combination with a circuit including a source of current and a resistance, of a second resistance connected in parallel with a part of said circuit, a deflection instrument and a source of electro-motive-force of unknown value connected in series with each other and in parallel with said second resistance, means for adjusting the fall of potential across said second resistance to equality with the unknown electro-motive-force, said second resistance having a magnitude equal to the resistance of said deflection instrument, and means for disconnecting said source of electro-motive-force of unknown value and substituting said deflection instrument for said second resistance, whereby said deflection instrument indicates the value of said unknown electro-motive-force.

11. The combination with a circuit including a source of current and a resistance, of a second resistance connected in parallel with a part of said circuit, a deflection instrument and a source of electro-motive-force of unknown value connected in series with each other and in parallel with said second resistance, said deflection instrument comprising a coil movable in a permanent magnet field, means for adjusting the fall of potential across said second resistance to equality with the unknown electro-motive-force, said second resistance having a magnitude equal to the resistance of said deflection instrument, and means for disconnecting said source of electro-motive-force of unknown value and substituting said deflection instrument for said second resistance, whereby said deflection instrument indicates the value of said unknown electro-motive-force.

12. The combination with a circuit including a source of current and a resistance, of a second resistance connected in parallel with a part of said circuit, a deflection instrument and a thermo-element connected in series with each other and in parallel with said second resistance, means for adjusting the fall of potential across said second resistance to equality with the electro-motive-force of said thermo-element, said second resistance having a magnitude equal to the resistance of said deflection instrument, and means for disconnecting said thermo-element and substituting said deflection instrument for said second resistance, whereby said instrument produces a deflection corresponding with the electro-motive-force of said thermo-element.

13. The combination with a circuit including a source of current and a resistance, of a second resistance connected in parallel with a part of said circuit, a deflection instrument and a thermo-element connected in series with each other and in parallel with said second resistance, said deflection instrument comprising a coil movable in a permanent magnet field, means for adjusting the fall of potential across said second resistance to equality with the electro-motive-force of said thermo-element, said second resistance having a magnitude equal to the resistance of said deflection instrument, and means for disconnecting said thermo-element and substituting said deflection instrument for said second resistance, whereby said instrument produces a deflection corresponding with the electro-motive-force of said thermo-element.

14. The combination with a resistance, of a deflection instrument and a source of electro-motive-force of unknown value connected in series with each other and in parallel with said resistance, means for passing through said resistance a current of magnitude causing in said resistance a fall of potential equal to the unknown electro-motive-force of said source, and means for disconnecting said source of electro-motive-force of unknown value and for connecting said deflection instrument in circuit with said resistance, whereby said instrument produces a deflection indicative of the value of the unknown electro-motive-force.

15. The combination with a resistance, of a deflection instrument and a source of electro-motive-force of unknown value connected in series with each other and in parallel with said resistance, said deflection instrument comprising a coil movable in a permanent magnet field, means for passing through said resistance a current of magnitude causing in said resistance a fall of potential equal to the unknown electro-motive-force of said source, and means for disconnecting said source of electro-motive-force of unknown value and for connecting said deflection instrument in circuit with said resistance, whereby said instrument produces a deflection indicative of the value of the unknown electro-motive-force.

16. The combination with a resistance, of a deflection instrument comprising a coil movable in a permanent magnet field, a thermo-element, said deflection instrument and said thermo-element connected in series with each other and in parallel with said resistance, means for passing through said resistance a current of magnitude causing in said resistance a fall of potential equal to the electro-motive-force of said thermo-element, and means for disconnecting said thermo-element and for connecting said deflection instrument in circuit with said resistance, whereby said instrument produces a deflection indicative of the electro-motive-force of said thermo-element.

In testimony whereof I have hereunto affixed my signature this 28 day of April, 1916.

EDWIN F. NORTHRUP.

Witnesses:
E. V. BALDWIN,
EDW. A. FROHLING.